(12) United States Patent
Guidati et al.

(10) Patent No.: US 7,985,278 B2
(45) Date of Patent: Jul. 26, 2011

(54) METHOD OF SEPARATING $CO_2$ FROM A GAS FLOW, $CO_2$ SEPARATING DEVICE FOR CARRYING OUT THE METHOD, SWIRL NOZZLE FOR A $CO_2$ SEPARATING DEVICE

(75) Inventors: Gianfranco Guidati, Zürich (CH); Alexander Ni, Baden (CH)

(73) Assignee: Alstom Technology Ltd., Baden (CH)

( * ) Notice: Subject to any disclaimer, the term of this patent is extended or adjusted under 35 U.S.C. 154(b) by 258 days.

(21) Appl. No.: 12/366,954

(22) Filed: Feb. 6, 2009

(65) Prior Publication Data
US 2009/0173073 A1    Jul. 9, 2009

Related U.S. Application Data

(63) Continuation of application No. PCT/EP2007/057434, filed on Jul. 18, 2007.

(60) Provisional application No. 60/821,591, filed on Aug. 7, 2006.

(30) Foreign Application Priority Data

Mar. 7, 2007 (CH) .................................. 00363/07

(51) Int. Cl.
*B01D 53/00* (2006.01)
(52) U.S. Cl. ................. 95/39; 95/139; 55/459.1; 60/311
(58) Field of Classification Search .............. 95/39, 139; 55/457, 459.1; 60/311
See application file for complete search history.

(56) References Cited

U.S. PATENT DOCUMENTS

| | | | |
|---|---|---|---|
| 2,607,439 A | 8/1952 | Dickens et al. | |
| 4,504,285 A * | 3/1985 | Modisette | .......................... 62/86 |
| 4,886,523 A | 12/1989 | Maldague | |
| 6,648,944 B1 * | 11/2003 | Baker et al. | ....................... 95/39 |
| 2002/0189443 A1 | 12/2002 | McGuire | |
| 2002/0194988 A1 | 12/2002 | Betting et al. | |
| 2003/0145724 A1 | 8/2003 | Betting et al. | |
| 2004/0262218 A1 | 12/2004 | Betting et al. | |

FOREIGN PATENT DOCUMENTS

| | | |
|---|---|---|
| DE | 1932872 B1 | 7/1970 |
| DE | 1938695 B1 | 3/1971 |
| EP | 1017465 B1 | 11/2002 |
| GB | 2098514 A | 11/1982 |
| WO | 03029739 A2 | 4/2003 |

* cited by examiner

*Primary Examiner* — Robert A Hopkins
(74) *Attorney, Agent, or Firm* — Volpe and Koenig, P.C.

(57) ABSTRACT

A method is provided for separating $CO_2$ from an exhaust gas flow of a combustion process. The method includes: compressing the gas flow and cooling the compressed gas flow. The method also includes feeding the cooled gas flow to a swirl nozzle and separating the $CO_2$ from the gas flow in the swirl nozzle. The method also includes discharging the $CO_2$ which is separated in the swirl nozzle from the swirl nozzle for separate further treatment. A $CO_2$ separating device is also provided that separates $CO_2$ from an exhaust gas flow of a combustion process that operates with fossil fuels. The device includes a swirl nozzle which is exposed to through-flow of the gas flow, a compressor located upstream or downstream of the swirl nozzle, and a plurality of cooling devices which are provided upstream of the swirl nozzle for cooling of the gas flow which comes from the compressor.

36 Claims, 11 Drawing Sheets

METHOD OF SEPARATING $CO_2$ FROM A GAS FLOW, $CO_2$ SEPARATING DEVICE FOR CARRYING OUT THE METHOD, SWIRL NOZZLE FOR A $CO_2$ SEPARATING DEVICE

CROSS REFERENCE TO RELATED APPLICATIONS

This application is a continuation of International Application No. PCT/EP2007/057434 filed Jul. 18, 2007, which claims priority to U.S. Provisional Application No. 60/821,591 filed Aug. 7, 2006 and Swiss Application No. 00363/07 filed Mar. 7, 2007, the contents of which are all incorporated by reference as if fully set forth.

FIELD OF INVENTION

The present invention relates to the field of climate protection technology. It refers to a method for separating $CO_2$ from a gas flow, a $CO_2$ separating device for carrying out the method, a swirl nozzle for such a $CO_2$ separating device, and various applications of the $CO_2$ separating device

BACKGROUND

The increasing environmental awareness and the introducing of business with $CO_2$ certificates have led to technologies for separating $CO_2$ becoming increasingly attractive for commercial application. In the past, suggested solutions have already been made, of which some referred to chemical processes (for example "MEA scrubbing"), or to physical principles (for example "frosting").

Furthermore, methods for the separation of fluids are known which operate by the generating of supersonic vortex flows. A corresponding cyclonic fluid separator is described in WO 03/029739-A2. A similar device is disclosed in US-A1-2003/0145724.

It is important for the solution of the $CO_2$ problem that corresponding technical methods are economically justifiable, occasion low investment costs, and have the lowest possible negative effects on the efficiency of the affected systems (for example power plants) which produce $CO_2$.

SUMMARY

The present disclosure is directed to a method for separating $CO_2$ from an exhaust gas flow of a combustion process which operates with fossil fuels. The method includes: compressing the gas flow and cooling the compressed gas flow. The method also includes feeding the cooled gas flow to a swirl nozzle and separating the $CO_2$ from the gas flow in the swirl nozzle. The method also includes discharging the $CO_2$ which is separated in the swirl nozzle from the swirl nozzle for separate further treatment.

A $CO_2$ separating device is also provided that separates $CO_2$ from an exhaust gas flow of a combustion process that operates with fossil fuels. The device includes a swirl nozzle which is exposed to through-flow of the gas flow. The device also includes a compressor which is located upstream or downstream of the swirl nozzle, and a plurality of cooling devices which are provided upstream of the swirl nozzle for cooling of the gas flow which comes from the compressor.

The present disclosure is also directed to a steam power plant. The power plant includes a boiler with a combustion chamber; a subsequent steam generator; and a $CO_2$ separating device. The $CO_2$ separating device separates $CO_2$ from an exhaust gas flow of a combustion process that operates with fossil fuels. The device includes a swirl nozzle which is exposed to through-flow of the gas flow. The device also includes a compressor which is located upstream or downstream of the swirl nozzle, and a plurality of cooling devices which are provided upstream of the swirl nozzle for cooling of the gas flow which comes from the compressor. The exhaust gases are fed to the $CO_2$ separating device after leaving the boiler.

A combined cycle plant is also provided and includes a gas turbine, a heat recovery steam generator which is connected downstream, and a $CO_2$ separating device. The $CO_2$ separating device separates $CO_2$ from an exhaust gas flow of a combustion process that operates with fossil fuels. The device includes a swirl nozzle which is exposed to through-flow of the gas flow. The device also includes a compressor which is located upstream or downstream of the swirl nozzle, and a plurality of cooling devices which are provided upstream of the swirl nozzle for cooling of the gas flow which comes from the compressor. The exhaust gases are fed to the $CO_2$ separating device after leaving the heat recovery steam generator.

Also disclosed is a combined heat and power plant or a vehicle having an internal combustion engine and a $CO_2$ separating device. The $CO_2$ separating device separates $CO_2$ from an exhaust gas flow of a combustion process that operates with fossil fuels. The device includes a swirl nozzle which is exposed to through-flow of the gas flow. The device also includes a compressor which is located upstream or downstream of the swirl nozzle, and a plurality of cooling devices which are provided upstream of the swirl nozzle for cooling of the gas flow which comes from the compressor. The exhaust gases of the internal combustion engine are fed to the $CO_2$ separating device.

A building heating system is also provided that includes a heating boiler and a $CO_2$ separating device. The $CO_2$ separating device separates $CO_2$ from an exhaust gas flow of a combustion process that operates with fossil fuels. The device includes a swirl nozzle which is exposed to through-flow of the gas flow. The device also includes a compressor which is located upstream or downstream of the swirl nozzle, and a plurality of cooling devices which are provided upstream of the swirl nozzle for cooling of the gas flow which comes from the compressor. The exhaust gases of the heating boiler are fed to the $CO_2$ separating device.

BRIEF DESCRIPTION OF THE DRAWINGS

The embodiments are subsequently to be explained in detail based on exemplary embodiments in connection with the drawing. In the drawings.

DETAILED DESCRIPTION OF THE PREFERRED EMBODIMENTS

Introduction to the Embodiments

A method for separating $CO_2$ is provided, which in practice is advantageously applicable, and also to disclose an associated system, including the required swirl nozzle, and the application possibilities of the system.

It is essential that for separating $CO_2$ from a gas flow which occurs as exhaust gas (flue gas) during combustion of fossil fuels, the gas flow is compressed in a first step, that the compressed gas flow is cooled down in a second step, that the cooled gas flow is fed to a swirl nozzle in a third step and in the swirl nozzle $CO_2$ is separated from the gas flow, and that in a fourth step the $CO_2$ which is separated in the swirl nozzle is discharged from the swirl nozzle for separate further treatment.

A development of the method is shown within the second step the compressed gas flow is first precooled in a heat exchanger which operates with cooling water, and the gas flow which is precooled in the heat exchanger is further cooled by at least one refrigeration cycle which operates with a compressor, condenser, expansion valve and evaporator.

For further cooling, the precooled gas flow can especially be further cooled by two refrigeration cycles in series which operate with a compressor, condenser, expansion valve and evaporator.

According to a preferred development, for further cooling the precooled gas flow is delivered in each case through the evaporator of the refrigeration cycle, or the evaporators of the refrigeration cycles, as the case may be.

Another development of the method is that the gas flow is supplied for compression approximately at room temperature, and after compression is precooled again in the heat exchanger approximately to room temperature.

Another development is that the gas flow is further cooled by the first refrigeration cycle only to a point where no water from the gas flow freezes out in the associated heat exchanger, and in that the gas flow is further cooled by the second refrigeration cycle to a temperature of about −50° C., wherein the evaporator of the second refrigeration cycle is de-iced at certain time intervals for removal of ice, and for de-icing of the evaporator the precooling of the gas flow in the heat exchanger, which operates with cooling water, is interrupted.

According to a further development of the method, the gas flow with low $CO_2$ content which issues from the swirl nozzle is delivered through the condenser of the second refrigeration cycle for cooling of the coolant in the second refrigeration cycle.

Another development is that the $CO_2$ which is separated in the swirl nozzle is supplied to a liquefying plant for liquefaction.

A further development of the method is that the cooled down gas flow in an inlet section of the swirl nozzle is first set in rotation around the axis of the swirl nozzle, and that the rotating flow which results in the process is then reduced in diameter, in that the rotating flow which is reduced in diameter is then delivered through a middle section of the swirl nozzle with constant diameter, wherein $CO_2$ is enriched in the outer edge region of the swirl nozzle, and in that at the end of the middle section, before an end section, the enriched $CO_2$ is separated out at a $CO_2$ outlet which is located on the outer periphery of the swirl nozzle, wherein in the end section of the swirl nozzle the pressure in the gas flow which flows towards the gas outlet is increased by enlargement of the diameter.

A development of the $CO_2$ separating device of the disclosure is that the plurality of cooling devices which are provided upstream of the swirl nozzle comprise at least one heat exchanger which is flow-washed by cooling water, and at least one refrigeration cycle which is connected downstream to the heat exchanger and operates with a compressor, condenser, expansion valve and evaporator.

Two refrigeration cycles which are arranged in series and which in each case operate with a compressor, condenser, expansion valve and evaporator, are preferably connected downstream to the heat exchanger, wherein the condenser of the first refrigeration cycle is flow-washed by cooling water, and the condenser of the second refrigeration cycle is exposed to through-flow of the gas flow with low $CO_2$ content which issues from the swirl nozzle, and wherein the two compressors of the refrigeration cycles are driven by a common motor. A liquefying plant for liquefaction of the separated $CO_2$ can especially be connected downstream to the swirl nozzle.

One development of the swirl nozzle of the device is that radially arranged inlet guide vanes are arranged in the inlet section for imposing the rotation, and that the inlet guide vanes are adjustable.

Another development is that a $CO_2$ outlet is provided between the middle section and the end section on the outer periphery of the swirl nozzle.

Members for accelerating the gas flow in the circumferential direction can especially be provided in the inlet section of the swirl nozzle, wherein the accelerating members comprise either concentric annular nozzles, through which air is injected in a direction which is adapted to the rotation of the gas flow in the swirl nozzle, or comprise wall segments which rotate around the axis of the swirl nozzle, the rotational velocity of which wall segments is adapted to the rotation of the gas flow in the swirl nozzle.

Detailed Description

The present disclosure refers to the separation of $CO_2$ from the exhaust gas (flue gas) of a machine or plant which uses carbon (for example coal) or hydrocarbons (for example methane, methanol, ethanol, etc.) as fuel. The fuel is oxidized in the machine or plant, as the case may be, as a result of which $CO_2$ is formed. The heat which results during the oxidation process is either converted into mechanical or electrical energy (for example by a generator), or is used directly as process heat or is used for heating (for example of a building). Such a machine or plant, as the case may be, can be a coal-fired or a gas-fired or oil-fired power plant (for example a gas turbine), as the case may be, a combined cycle plant, a stationary diesel engine, a building heating system, or an engine of a vehicle, or the like.

A principle of the disclosure is a treatment of the exhaust gases (flue gases), which are enriched with $CO_2$, which treatment comprises the following steps:

(1) The exhaust gas (flue gas) is cooled down by a heat exchanger to ambient temperature (about 20° C.-25° C.);
(2) the exhaust gas (flue gas) is compressed to a pressure level of about 2-3 bar;
(3) the compressed exhaust gas (flue gas) is cooled down again to ambient temperature;
(4) the exhaust gas (flue gas) is actively cooled by a refrigeration cycle to temperatures of about −40° C. to −50° C.;
(5) the cooled exhaust gas (flue gas) is then cooled in a swirl nozzle by rapid expansion in a vortex at supersonic speed so much so that solid $CO_2$ particles are formed;
(6) by the centrifugal effect the $CO_2$ is enriched on the outer wall;
(7) the enriched $CO_2$ is extracted from the swirl nozzle for further treatment; and
(8) the coldness of the residual gas which issues from the swirl nozzle is recuperated in a heat exchanger and returned to the active refrigeration cycle.

Figure 1:
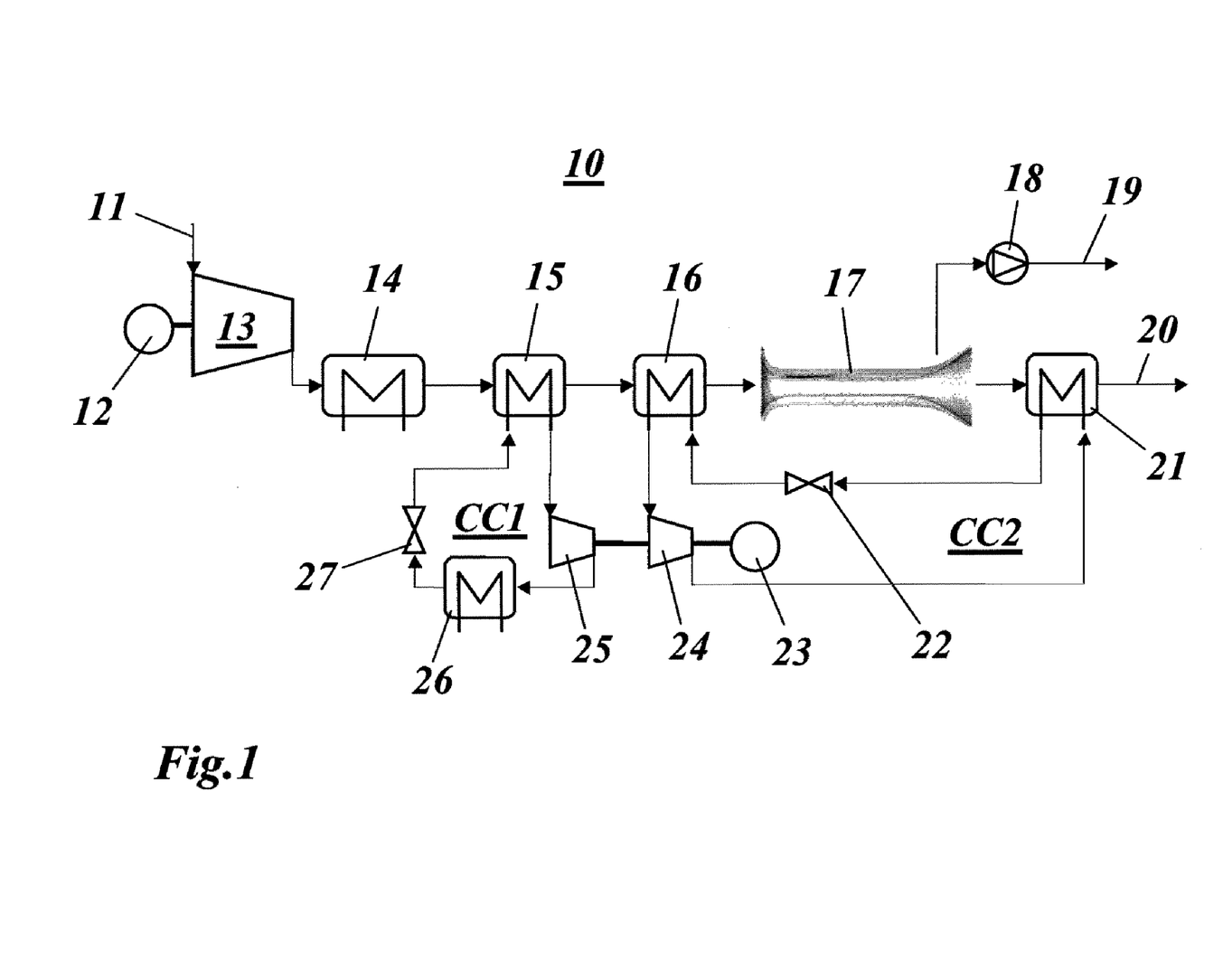
FIG. 1 shows the simplified scheme of a $CO_2$ separating device according to an exemplary embodiment.

The simplified scheme of a $CO_2$ separating device according to one exemplary embodiment of the invention is displayed in FIG. 1. The exhaust gas which is enriched with $CO_2$ enters the $CO_2$ separating device 10 through an inlet 11, at an approximate ambient temperature of 25° C. The exhaust gas (flue gas) is first compressed in a compressor 13 which is driven by a motor 12, and is heated in the process. After compression, the gas is re-cooled by a heat exchanger, which operates with cooling water, to approximately 25° C. After that, the gas enters an active cooling device which comprises two refrigeration cycles CC1 and CC2 which are connected in series. Each of the refrigeration cycles CC1, CC2 comprises an evaporator 14 or 15, as the case may be, a compressor 24 or 25, as the case may be, a condenser 21 or 26, as the case may be, and an expansion valve 22 or 27, as the case may be.

The first refrigeration cycle CC1 extracts heat from the exhaust gas in the first evaporator 15 and yields this to the cooling water which flows through the first condenser 26. The outlet temperature of the first evaporator 15 is selected so that no water can freeze out on the heat exchanger surfaces of the first evaporator 15. The exhaust gas then flows through the second evaporator 16 of the second refrigeration cycle CC2. The second evaporator 16 lowers the temperature of the exhaust gas to about −50° C. In order to reduce the energy consumption of the second refrigeration cycle CC2, the condenser 21 of this cycle is located at the outlet of the swirl nozzle 17 in order to utilize the coldness of the residual gas which issues there. The two refrigeration cycles CC1 and CC2 are kept going by compressors 24, 25 which in the exemplary embodiment are driven by a common motor 23. On account of the low temperatures at the second evaporator 16, the residual water in the exhaust gas is deposited on the heat exchanger surfaces there as an ice film. Consequently, a deicing process becomes necessary, where at certain time intervals the water cooling in the heat exchanger 14 is reduced or completely deactivated. Exhaust gas then flows at a temperature of about 100° C. into the evaporator 16, which leads to a deicing. The deicing requires about 1% of the overall operating time.

After leaving the second evaporator 16, the exhaust gas enters a swirl nozzle (or a plurality of parallel operating) swirl nozzles 17, where it is further cooled by acceleration (as is further explained again below). This further cooling leads to a separation of $CO_2$ from the exhaust gas. The $CO_2$ is extracted from the swirl nozzle 17 and then directed to a liquefying plant 18 where it is liquefied and prepared for further transporting in a pipeline 19.

Figure 2:
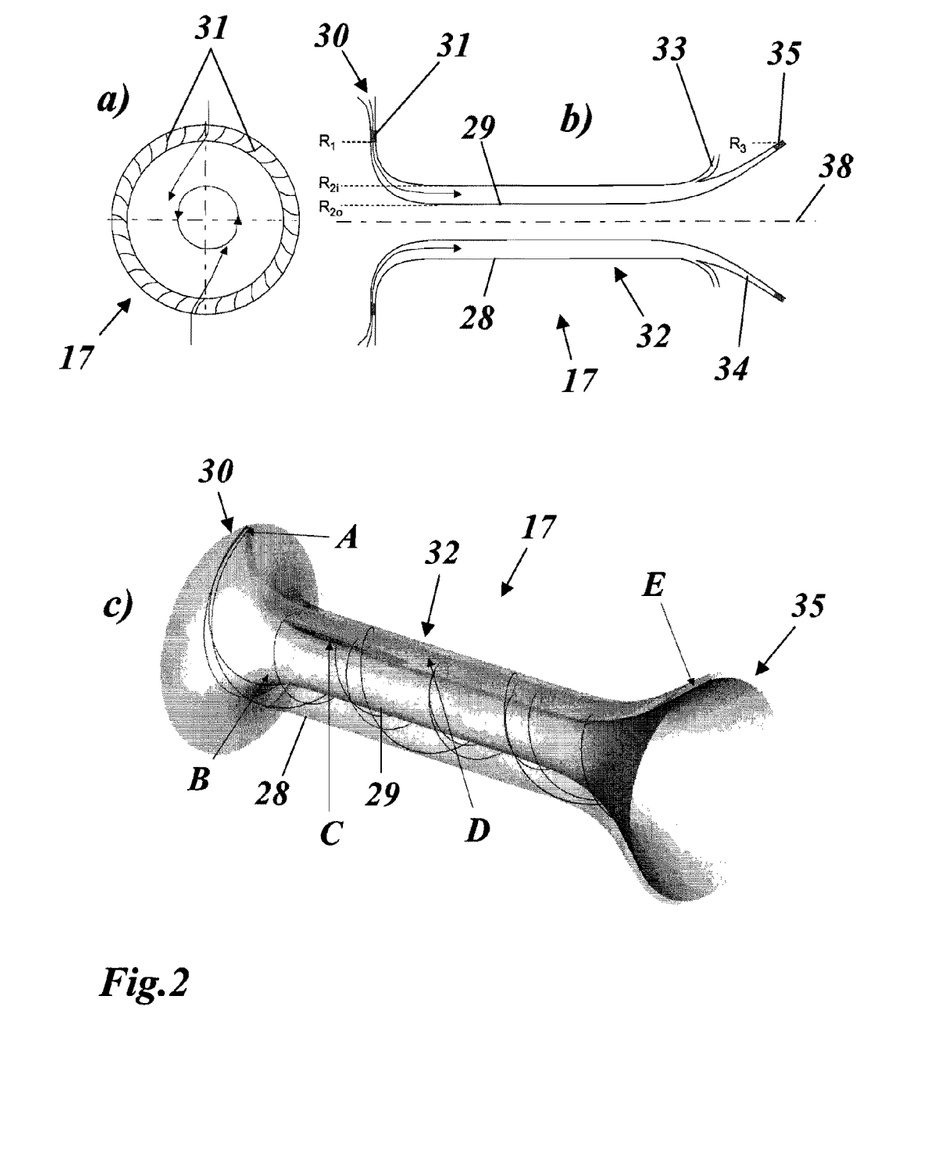
FIG. 2 shows in three separate FIGS. 2(a), 2(b) and 2(c) a swirl nozzle according to a preferred exemplary embodiment in axial view (FIG. 2(a)), in longitudinal section (FIG. 2(b)) and in perspective side view (FIG. 2(c)), with different marked positions (A, . . . , E) for clarification of the function.

An essential component part of the $CO_2$ separating device 10 of FIG. 1 is the swirl nozzle 17, which in FIG. 2 is represented in different views. The swirl nozzle 17 is coaxially constructed and extends along an axis 38. It has an inner wall 29 and an outer wall 28 in concentric arrangement, between which an annular passage for the exhaust gas flow is formed. The swirl nozzle 17 is divided into an inlet section 30 with tapering diameter, a middle section 32 with constant (or slightly increasing or decreasing) diameter, and an end section 34 with a diameter which quickly widens again. FIG. 2(a) shows in an axial viewing direction the inlet section 30 with radially acting inlet guide vanes 31 which are arranged in the inlet region. FIG. 2(b) shows the longitudinal section through the swirl nozzle 17.

The exhaust gas (flue gas) enters the swirl nozzle 17 with a diameter $R_1$ from the left. By the inlet guide vanes 31 which are adjustable, a rotational movement around the axis 38 is impressed upon the exhaust gas flow (position A in FIG. 2(c)). The exhaust gas is then directed to a section with smaller radius, which is defined by the radius $R_{2i}$ of the outer wall 28 and $R_{2o}$ of the inner wall 29 in the region of the middle section 32. On account of maintaining the rotational impulse, the rotational velocity is increased to supersonic values (position B in FIG. 2(c)) as a result. The increase of kinetic energy is accompanied by a drop of the static temperature of the exhaust gas to about 100 K (position C in FIG. 2(c)). The average velocity in the axial direction of the swirl nozzle is always in the subsonic range in this case.

If the static temperature falls below the saturation temperature of the $CO_2$ with a given partial pressure, particles of $CO_2$-ice are spontaneously formed in the exhaust gas (position D in FIG. 2(c)). The desublimation heat of the $CO_2$ is absorbed by the exhaust gas. This energy feed to the exhaust gas leads to a temperature increase which would ultimately prevent the desublimation. The temperature increase, however, can be controlled by the flow in the middle section of the nozzle being slowly guided to a smaller radius. In this case, the energy which is released by the desublimation is stored in further kinetic energy. The $CO_2$-ice particles are centrifuged by the rotational movement towards the outer wall 28 of the swirl nozzle 17. Since the rotational velocity is inversely proportional to the radius, the static temperature in the outer zone is higher than in the core flow. Consequently, some of the $CO_2$-ice is resublimated into the gas phase. This effect is augmented by the flow in the end section 34 being returned to a larger radius ($R_3$ in the gas outlet 35; position E in FIG. 2(c)).

The reason for the renewed sublimation of the $CO_2$ particles is that the overall pressure, which during the release of the desublimation heat is lost in the forming of the particles, is recuperated again. By this, the overall pressure loss in the swirl nozzle 17 is limited and, along with it, also the compression effort which has to be expended in the compressor 13.

The gaseous $CO_2$ remains concentrated in the outer zone of the swirl nozzle 17 because it (1) has a 50% higher density than air and (2) the centrifugal flow field generates forces which correspond approximately to 50000 times the gravitational acceleration. The concentrated $CO_2$ is extracted through slots in the outer wall 28 of the swirl nozzle 17 and is guided via a $CO_2$ outlet 33 to a liquefying plant (18 in FIG. 1). During compression of the $CO_2$, the residual exhaust gas portion is separated out and the resulting fluid is discharged via a pipeline (19 in FIG. 1).

The principal energy consumption during the $CO_2$ separation affects the compressor 13 which increases the overall pressure upstream of the evaporators 15, 16 of the refrigeration cycles CC1 and CC2. This increased overall pressure is necessary to compensate the pressure losses in the heat exchangers and especially in the swirl nozzles 17. Since the velocity in the swirl nozzle is predominantly oriented in the circumferential direction, the wall friction of the flow is controlled by the azimuth component of the velocity. In order to minimize the wall friction, two methods can be adopted, which are exemplarily shown in FIG. 3(a) and FIG. 3(b).

According to FIG. 3(a), in a swirl nozzle 17' air is injected through annular slots (annular nozzles 36) in the wall at an angle which corresponds to the swirl angle of the core flow. As a result, the flow is accelerated in the azimuth direction and so reduces the overall pressure loss. The slots can be concentrically arranged in numbers in the inner wall 29 and/or in the outer wall 28. A slot is created by arrangement of individual wall elements which are at a distance from each other. The distance between the wall elements is maintained by ribs which are arranged so that the desired swirl angle of the injected air is achieved.

A similar acceleration of the flow according to FIG. 3(b) can be achieved in a swirl nozzle 17'' by rotation of the outer and/or inner wall 28 or 29, as the case may be, wherein the rotational velocity is oriented to the swirl velocity of the core flow. This is inversely proportional to the radius. Since the solid body rotation of the wall as a whole is directly proportional to the radius, a better coordination of the velocities can be achieved by dividing the wall into individual, separately rotating wall elements 37.

The two techniques (injection and rotation) can be used both on the inner wall 29 and on the outer wall 28. Although the figures only illustrate the principle in the region of the inlet of the nozzle, the two techniques can also be applied in the predominantly straight middle section and in the final end section 34, both on the outside and on the inside.

The end section 34 of the swirl nozzle 17 acts as a diffuser which brakes the flow to a low velocity at which it can then leave the swirl nozzle. This section is mainly responsible for the loss of overall pressure which has to be applied by the compressor 13. The diffusion can be augmented by outlet guide vanes being provided which convert the residual swirl into an increase of the static pressure.

Figure 3:
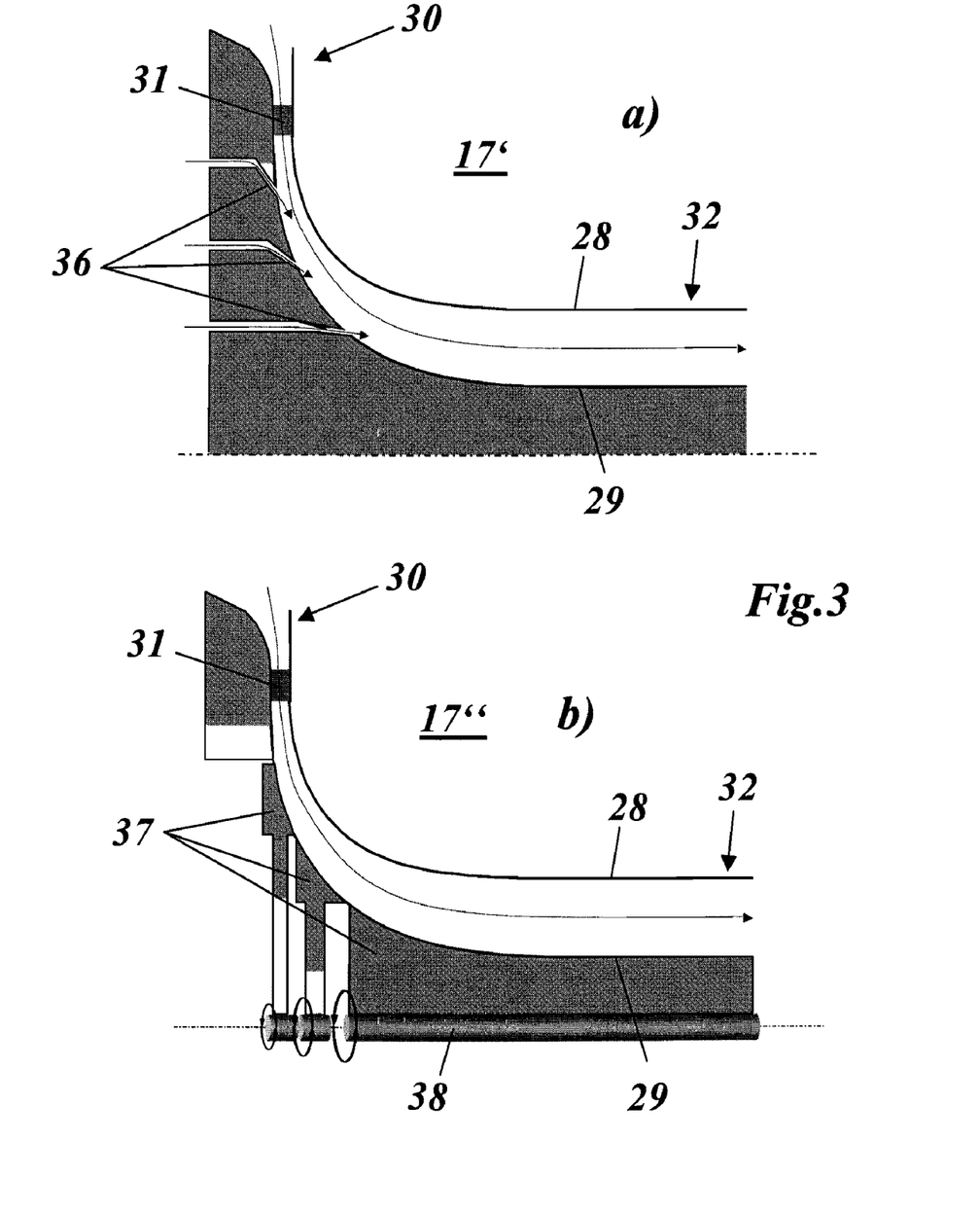
FIG. 3 shows in two separate FIGS. 3(a) and 3(b) two possibilities for promoting swirl of the gas flow which flows into the swirl nozzle.
Figure 4:
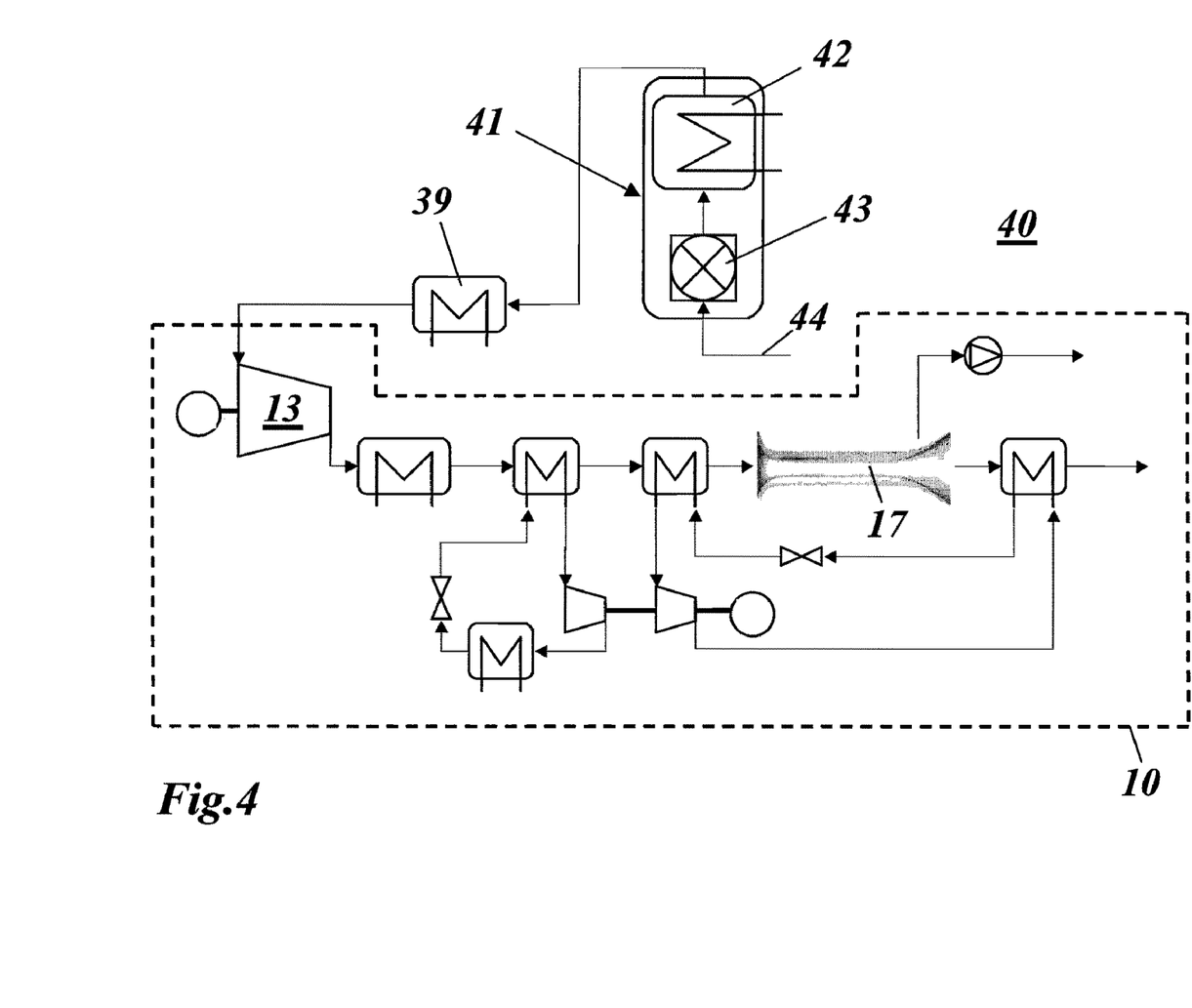
FIG. 4 shows the application of the $CO_2$ separating device from FIG. 1 in a steam power plant.

The $CO_2$ separating device 10 from FIG. 1 with one or more swirl nozzles according to FIGS. 2 and 3 can be used in the most diverse ways for the treatment of exhaust gases (flue gas). FIG. 4 shows the integration of a $CO_2$ separating device 10 in a coal-fired steam power plant 40 which operates with steam turbines. Coal which is made available via a fuel feed line 44 is combusted in a boiler 41 which comprises a combustion chamber 43 and a steam generator 42. The steam generator provides steam at high pressure and high temperature for a Rankine cyclic process. The flue gas leaves the boiler 41 at about 200° C. The flue gas is cooled down in a heat exchanger 39, through which cooling water flows, in order to lower the flue gas temperature at the inlet of $CO_2$ separating device 10 to about 25° C.

Figure 5:
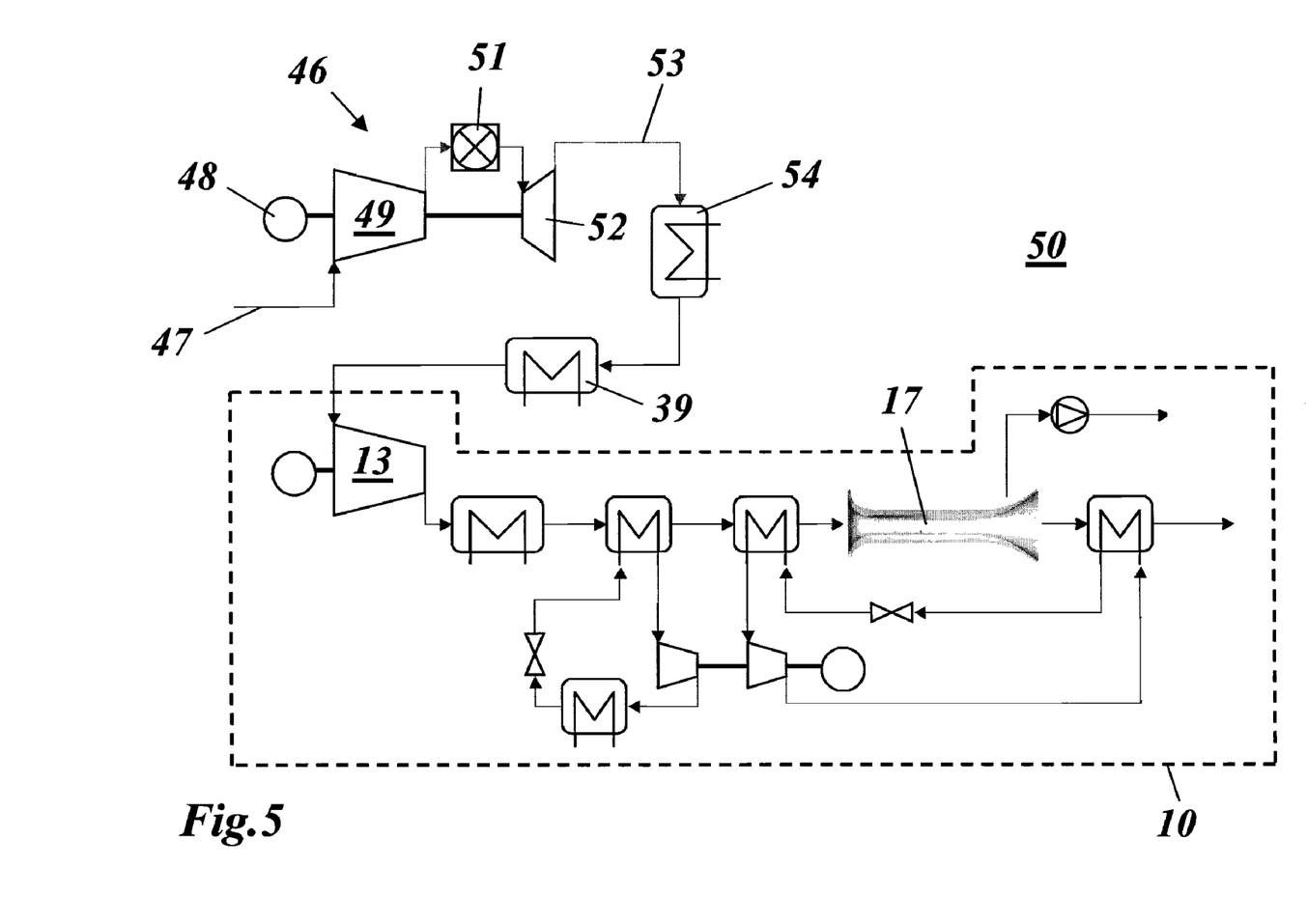
FIG. 5 shows the application of the $CO_2$ separating device from FIG. 1 in a combined cycle plant.
Figure 6:
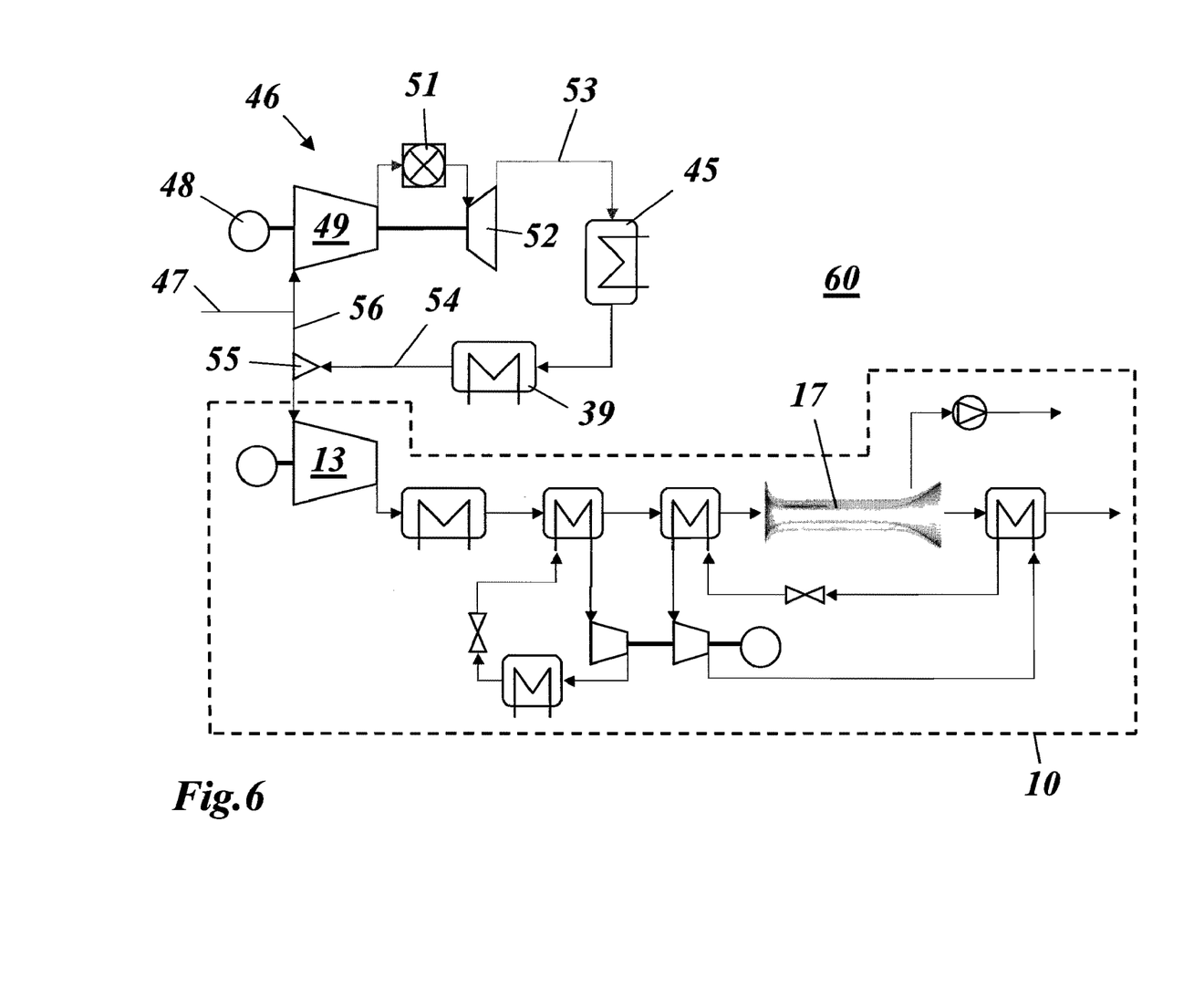
FIG. 6 shows the application of the $CO_2$ separating device from FIG. 1 in a combined cycle plant with exhaust gas recirculation.

FIGS. 5 and 6 show two exemplary possibilities, which are to integrate the $CO_2$ separating device 10 in a combined cycle plant 50 or 60, as the case may be, which is equipped with gas turbines 46. In the example of FIG. 5, the compressor 49 of the gas turbine 46 compresses ambient air which is fed via the air feed line 47, heats this up by combustion of hydrocarbons (for example natural gas, oil, syngas, etc) in a combustion chamber 51, and expands the hot gas, performing work in a turbine 52, which drives the compressor 49 and a generator 48. In order to recuperate the heat contained in the hot exhaust gas of the turbine 52, being more than 100° C., a heat recovery steam generator (HRSG) 45, which is connected downstream via an exhaust gas line 53, is used, which produces the steam for a Rankine cyclic process. The exhaust gas leaves the heat recovery steam generator 45 at a temperature of about 100° C. It is again cooled down in a heat exchanger 39, through which cooling water flows, in order to lower the flue gas temperature at the inlet of the $CO_2$ separating device 10 to about 25° C.

A variant of the combined cycle plant 50 from FIG. 5 is the combined cycle plant 60 from FIG. 6. In this case, some of the exhaust gas is branched off at a branch 55 which lies in the exhaust gas line 54 downstream of the heat exchanger 39, and is returned via a return line 56 to the inlet of the compressor 49. As a consequence of this, the portion of $CO_2$ in the exhaust gas which is guided to the $CO_2$ separating device 10 is increased, while the exhaust gas is altogether reduced. By this, the energy consumption of the compressor 13 in the $CO_2$ separating device 10 is reduced. The two variants can also be used in gas turbines with sequential combustion (for example of the type GT24/GT26 of the applicant).

Figure 7:
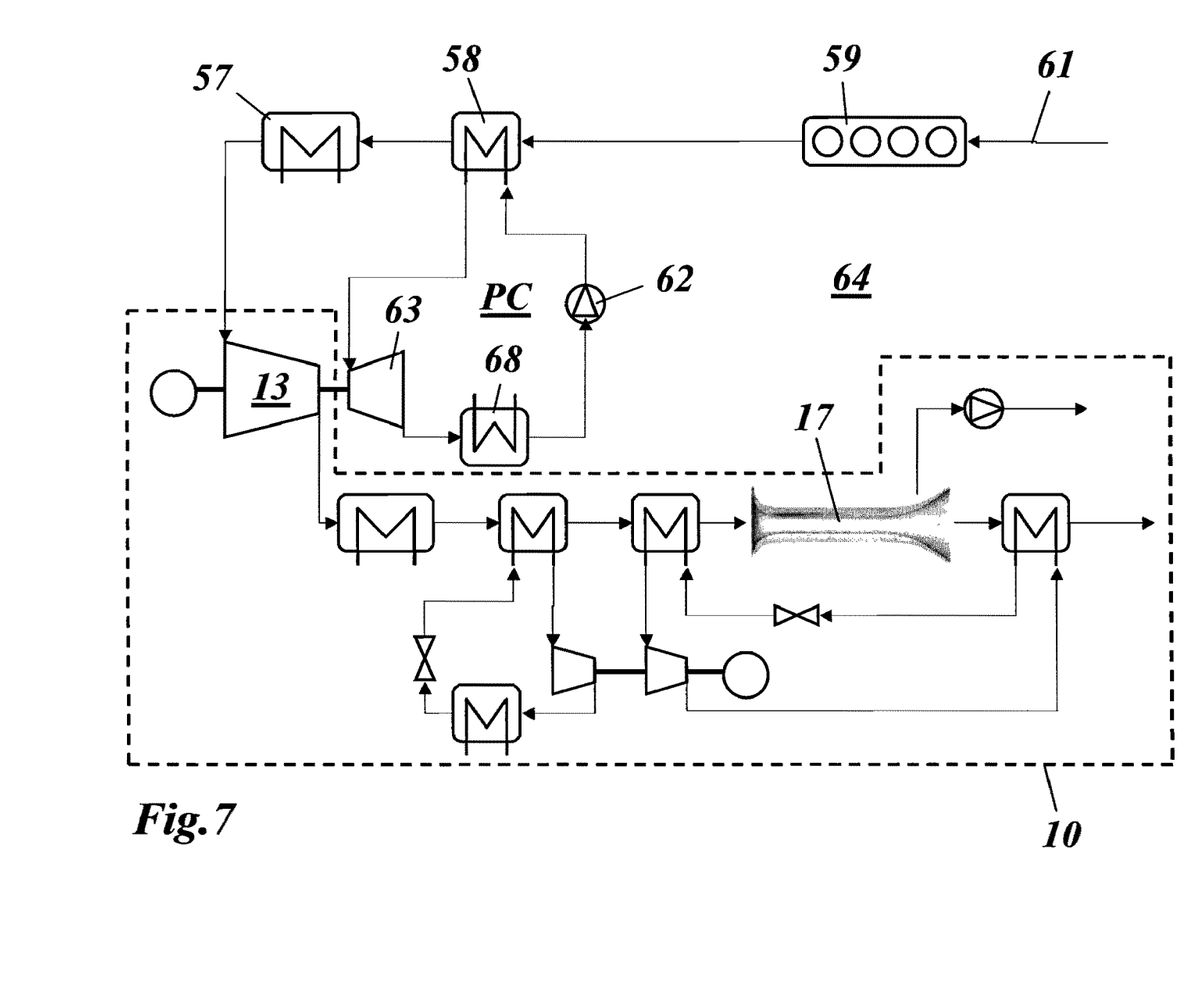
FIG. 7 shows the application of the $CO_2$ separating device from FIG. 1 in a combined heat and power plant or in a vehicle with internal combustion engine.

FIG. 7 shows an example for the integration of the $CO_2$ separating device 10 from FIG. 1 in a combined heat and power plant 64 which, for example, is equipped with an internal combustion engine (diesel) 59 which obtains fuel via a fuel feed line 61. Such plants can supply larger buildings or groups of houses with heat and power. The internal combustion engine 59 by ambient air combusts hydrocarbons (for example diesel fuel), and generates mechanical or electrical energy, as the case may be. The exhaust gas leaves the engine at high temperatures of 500-800° C. Since heat at such temperatures is ineffective for a house heating system, a power circuit PC is used which comprises an evaporator 58, a power turbine 63, a condenser 68 and a pump 62. The heat which is yielded in the condenser 68 is used for heating purposes in this case. The exhaust gas flows through the evaporator 58 of the power circuit PC and yields additional heat for heating purposes in a water-cooled heat exchanger 57 which is connected downstream. The exhaust gas temperature at the inlet of the $CO_2$ separating device 10 is then again about 25° C. The power turbine 63 of the power circuit PC in this case can drive the compressor 13 of the $CO_2$ separating device 10. The scheme of the plant of FIG. 7 can also be applied to land vehicles or watercrafts with internal combustion engines.

Figure 8:
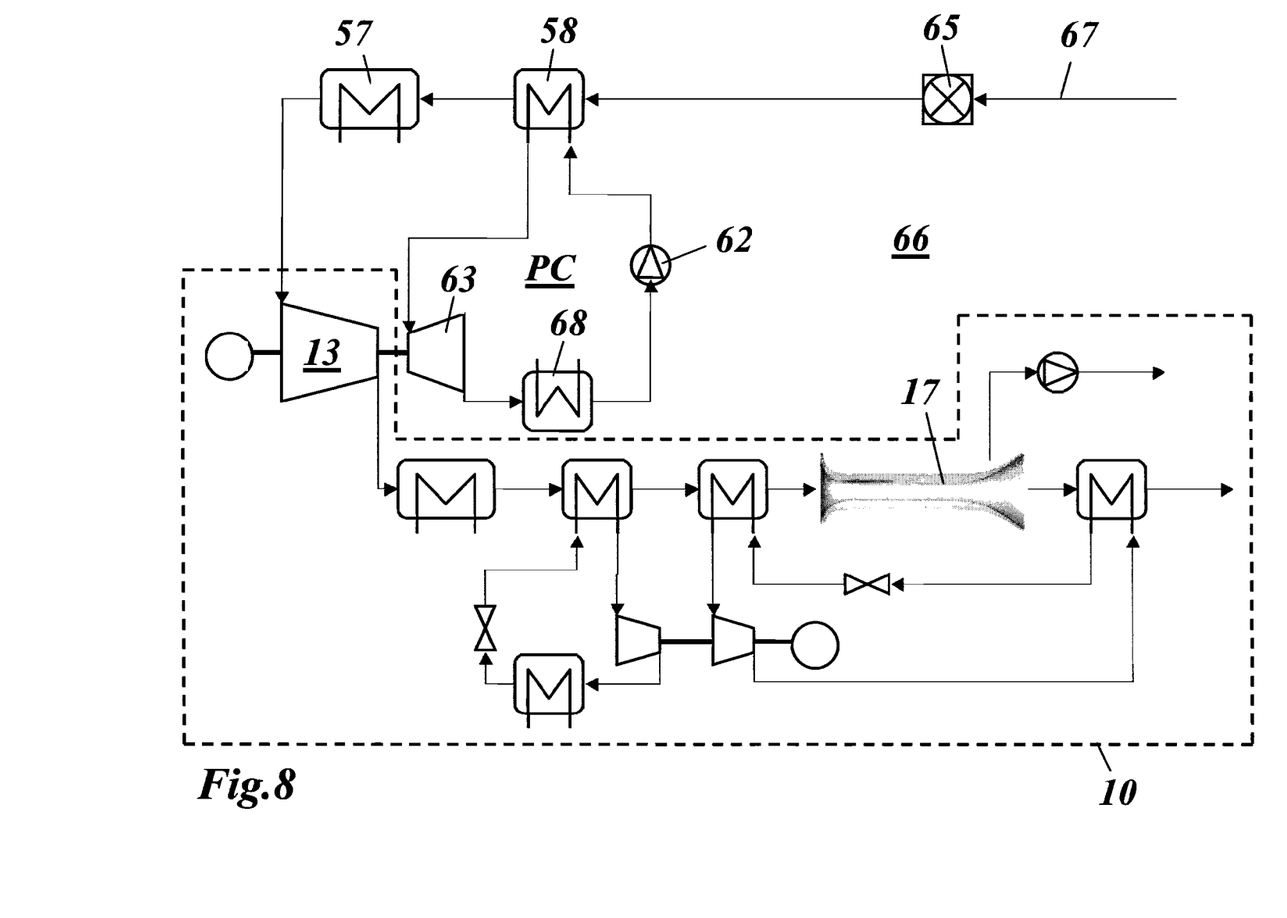
FIG. 8 shows the application of the $CO_2$ separating device from FIG. 1 in a building heating system.

The exegetically most inefficient way for the use of fossil fuels is their simple combustion for heating purposes. According to FIG. 8, in the case of a building heating system 66 a heating boiler 65 is supplied with fuel (coal, oil, natural gas, etc) via a fuel feed line 67. The $CO_2$ which is present in the exhaust gas can be separated in this case without energy loss because the heating provides the power which is required for driving the compressor 13 of the $CO_2$ separating device 10 via a power circuit PC. Instead of using the high temperature heat directly for heating, it is introduced in the power circuit, partially converted into mechanical energy, and then, at lower temperatures, extracted for heating purposes (condenser 68). The scheme of FIG. 8 in this case is similar to the scheme of FIG. 7.

Figure 10:
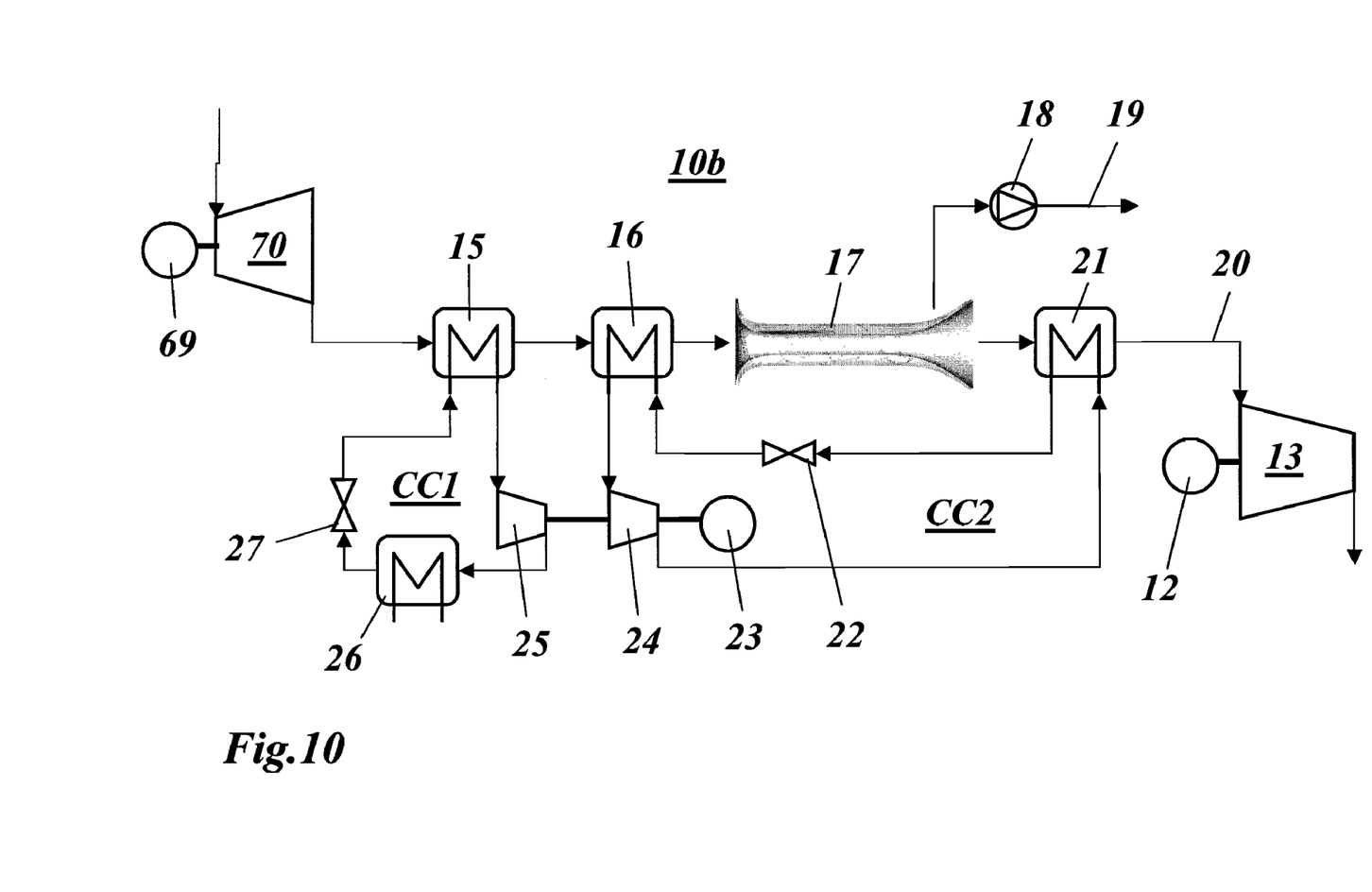
FIG. 10 shows a $CO_2$ separating device which is alternative to FIG. 9, where the compressor is located downstream of the swirl nozzle and a turbine is located upstream of the swirl nozzle.
Figure 11:
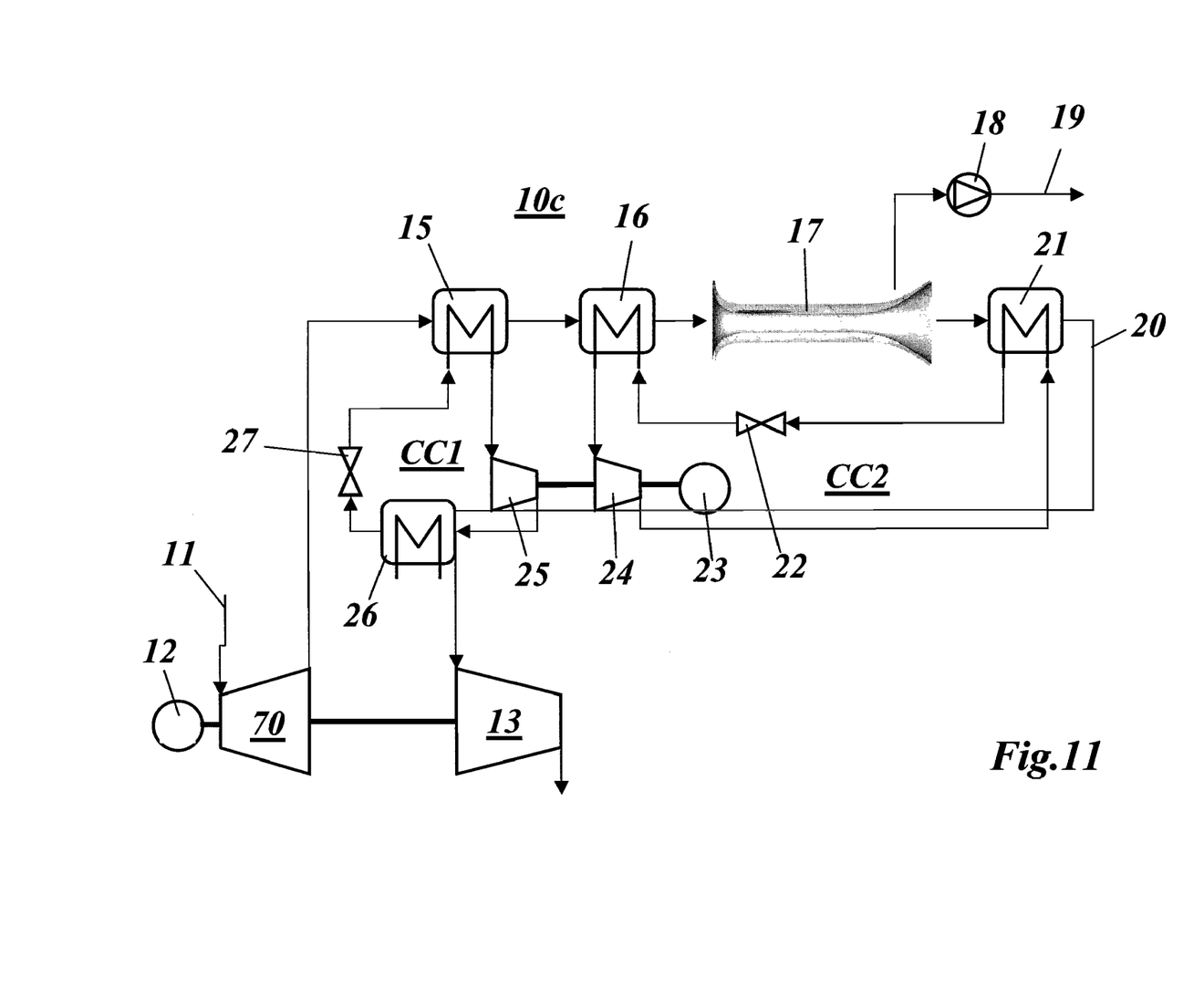
FIG. 11 shows a $CO_2$ separating device which is alternative to FIG. 10, in which turbine and compressor are arranged on a common shaft.

Further variants are also conceivable:

The exhaust gas flow according to FIG. 10 or 11 in $CO_2$ separating devices 10b or 10c, as the case may be, can be expanded by a turbine 70 in order to effect the initial cooling upstream of the swirl nozzle 17. In the swirl nozzle, the flow is further expanded, the $CO_2$ extracted, and the flow compressed again to atmospheric pressure by a compressor 13 which is connected downstream. In the variant of FIG. 10, compressor 13 and turbine 70 are separate. The turbine 70 drives a generator 69. In the variant from FIG. 11, turbine 70 and compressor 13 are arranged on a common shaft.

Figure 9:
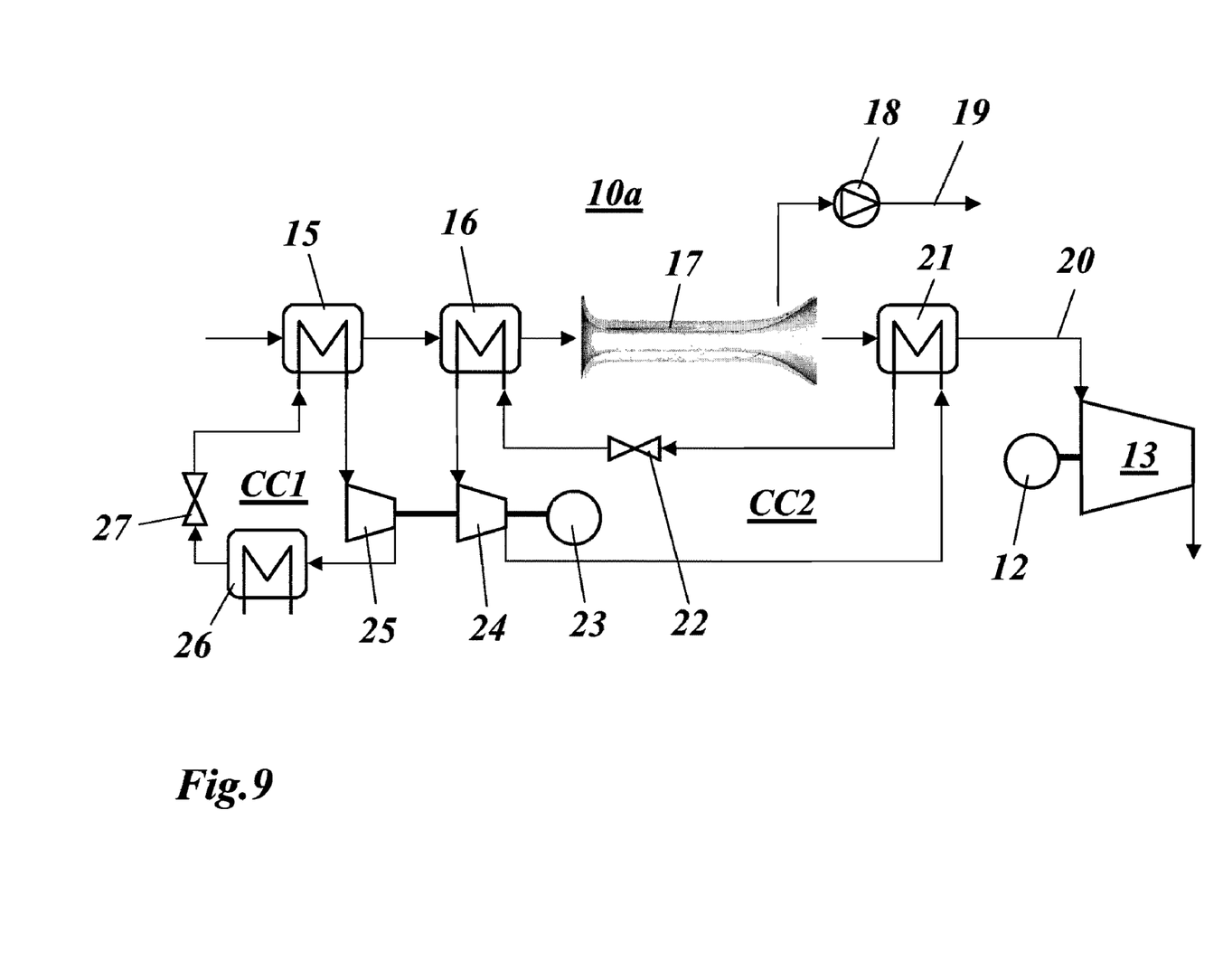
FIG. 9 shows a $CO_2$ separating device which is alternative to FIG. 1, where the compressor is located downstream of the swirl nozzle.

The exhaust gas flow according to FIG. 9, however, can also be directly expanded in the swirl nozzle 17 and is then compressed again to atmospheric pressure by a compressor 13 which is located downstream of the swirl nozzle 17.

LIST OF DESIGNATIONS 10, 10a,b,c $CO_2$ separating device
11 Inlet
12 Motor
13 Compressor
14, 39 Heat exchanger
15, 16 Evaporator
17, 17', 17" Swirl nozzle
18 Liquefying plant
19 Pipeline
20 Outlet
21, 26 Condenser
22, 27 Expansion valve
23 Motor
24, 25 Compressor
28 Outer wall
29 Inner wall
30 Inlet section (inlet)
31 Inlet guide vane
32 Middle section
33 $CO_2$ outlet
34 End section
35 Gas outlet
36 Annular nozzle
37 Wall segment (rotating)
38 Axis
40 Steam power plant (coal-fired)
41 Boiler
42 Steam generator
43 Combustion chamber
44, 61 Fuel feed line
45 Heat recovery steam generator
46 Gas turbine
47 Air feed line
48 Generator
49 Compressor
50, 60 Combined cycle plant
51 Combustion chamber
52 Turbine
53, 54 Exhaust gas line
55 Branch
56 Return line
57 Heat exchanger
58 Evaporator
59 Internal combustion engine
61, 67 Fuel feed line
62 Expansion valve
63 Power turbine
64 Combined heat and power plant
65 Heating boiler
66 Building heating system
68 Condenser
69 Generator
70 Turbine
A, . . . , E Position
CC1, CC2 Refrigeration cycle
PC Power circuit

What is claimed is:

1. A method for separating $CO_2$ from an exhaust gas flow of a combustion process which operates with fossil fuels, comprising:
   a. compressing the gas flow;
   b. precooling the compressed gas flow in a heat exchanger (14), which operates with cooling water, by at least one refrigeration cycle (CC1, CC2) which operates with a compressor (24, 25), condenser (21, 26), expansion valve (22, 27) and evaporator (15, 16);
   c. feeding the cooled gas flow to a swirl nozzle (17, 17', 17"), and separating the $CO_2$ from the gas flow in the swirl nozzle (17, 17', 17"); and
   d. discharging the $CO_2$ which is separated in the swirl nozzle (17, 17', 17") from the swirl nozzle (17, 17', 17") for separate further treatment.

2. The method as claimed in claim 1, wherein step b further comprises additional cooling of the gas flow which is precooled in the heat exchanger (14) by two refrigeration cycles (CC1, CC2) in series which operate with a compressor (24, 25), condenser (21, 26), expansion valve (22, 27) and evaporator (15, 16).

3. The method as claimed in claim 1, wherein for further cooling, the precooled gas flow is delivered in each case through the evaporator of the refrigeration cycle, or the evaporators (15, 16) of the refrigeration cycles (CC1, CC2).

4. The method as claimed in claim 1, wherein the gas flow is fed for compression approximately at room temperature, and after compression is precooled again in the heat exchanger (14) approximately to room temperature.

5. The method as claimed in claim 2, wherein the gas flow is further cooled by the first refrigeration cycle (CC1) only to a point where no water from the gas flow freezes out in the associated heat exchanger (15), and the gas flow is further cooled by the second refrigeration cycle (CC2) to a temperature of about −50° C.

6. The method as claimed in claim 5, wherein the evaporator (16) of the second refrigeration cycle (CC2) is deiced at certain time intervals for removal of ice.

7. The method as claimed in claim 6, wherein the precooling of the gas flow in the heat exchanger (14), which operates with cooling water, is interrupted when deicing the evaporator (16).

8. The method as claimed in claim 2, further comprising delivering the gas flow with low $CO_2$ content, which issues from the swirl nozzle (17, 17', 17"), through the condenser (21) of the second refrigeration cycle (CC2) for cooling of the coolant in the second refrigeration cycle (CC2).

9. The method as claimed in claim 1, further comprising supplying the $CO_2$, which is separated in the swirl nozzle (17, 17', 17"), to a liquefying plant (18) for liquefaction.

10. The method as claimed in claim 1, wherein the cooled gas flow in an inlet section (30) of the swirl nozzle (17, 17', 17") is first set in rotation around an axis (38) of the swirl nozzle (17, 17', 17"), the rotating flow which results in the process is then reduced in diameter, which is then delivered through a middle section (32) of the swirl nozzle (17, 17', 17") with constant diameter, $CO_2$ is enriched in an outer edge region of the swirl nozzle (17, 17', 17"), at the end of the middle section (32), before an end section (34), the enriched $CO_2$ is separated out at a $CO_2$ outlet (33) that is located on an outer periphery of the swirl nozzle (17, 17', 17").

11. The method as claimed in claim 10, wherein in the end section (34) of the swirl nozzle (17, 17', 17"), the pressure in the gas flow that flows towards a gas outlet (35) is increased by enlargement of the diameter.

12. A $CO_2$ separating device (10, 10a, 10b, 10c) that separates $CO_2$ from an exhaust gas flow of a combustion process that operates with fossil fuels, the device comprising a swirl nozzle (17, 17', 17") which is exposed to through-flow of the gas flow, a compressor (13) which is located upstream or downstream of the swirl nozzle (17, 17', 17"), and a plurality of cooling devices (14, CC1, CC2) which are provided upstream of the swirl nozzle (17, 17', 17") for cooling of the gas flow which comes from the compressor (13), the plurality of cooling devices (14, CC1, CC2) comprising at least one heat exchanger (14), through which cooling water flows, and at least one refrigeration cycle (CC1, CC2) which is connected downstream of the heat exchanger (14) and operates with a compressor (24, 25), condenser (21, 26), expansion valve (22, 27) and evaporator (15, 16).

13. The $CO_2$ separating device as claimed in claim 12, wherein two refrigeration cycles (CC1, CC2) are arranged in series and each operate with a compressor (24, 25), condenser (21, 26), expansion valve (22, 27) and evaporator (15, 16), are connected downstream of the heat exchanger (14).

14. The $CO_2$ separating device as claimed in claim 13, wherein the condenser (26) of the first refrigeration cycle (CC1), through which cooling water flows, and the condenser (21) of the second refrigeration cycle (CC2) are exposed to through-flow of the gas flow with low $CO_2$ content which issues from the swirl nozzle (17, 17', 17").

15. The $CO_2$ separating device as claimed in claim 13, wherein the two compressors (24, 25) of the refrigeration cycles are driven by a common motor (23).

16. The $CO_2$ separating device as claimed in claim 12, wherein a liquefying plant (18) for liquefaction of the separated $CO_2$ is connected downstream to the swirl nozzle (17, 17', 17").

17. A swirl nozzle (17, 17', 17") for a $CO_2$ separating device (10) that separates $CO_2$ from an exhaust gas flow of a combustion process that operates with fossil fuels, the $CO_2$ separating device comprising a swirl nozzle (17, 17', 17") which is exposed to through-flow of the gas flow, a compressor (13) which is located upstream or downstream of the swirl nozzle (17, 17', 17"), and a plurality of cooling devices (14, CC1, CC2) which are provided upstream of the swirl nozzle (17, 17', 17") for cooling of the gas flow which comes from the compressor (13), the swirl nozzle (17, 17', 17") comprising an inlet section (30), a middle section (32) which is connected to the inlet section, and an end section (34) which is connected to the middle section (32), arranged in series along an axis (38), wherein in the inlet section (30) the inflowing gas flow flows radially inwards, imposing a rotation around the axis (38), in the middle section (32) the gas flow flows further in the axial direction in an annular passage (28, 29) with reduced constant diameter, and finally, in the conically widening end section (34), reaches the gas outlet (35) of the swirl nozzle (17, 17', 17"), wherein radially arranged inlet guide vanes (31) are arranged in the inlet section (30) for imposing the rotation.

18. The swirl nozzle as claimed in claim 17, wherein the inlet guide vanes (31) are adjustable.

19. The swirl nozzle as claimed in claim 17, wherein a $CO_2$ outlet (33) is provided between the middle section (32) and the end section (34) on an outer periphery of the swirl nozzle (17, 17', 17").

20. A swirl nozzle (17, 17', 17") for a $CO_2$ separating device (10) that separates $CO_2$ from an exhaust gas flow of a combustion process that operates with fossil fuels, the $CO_2$ separating device comprising a swirl nozzle (17, 17', 17") which is exposed to through-flow of the gas flow, a compressor (13) which is located upstream or downstream of the swirl nozzle (17, 17', 17"), and a plurality of cooling devices (14, CC1, CC2) which are provided upstream of the swirl nozzle (17, 17', 17") for cooling of the gas flow which comes from the compressor (13), the swirl nozzle (17, 17', 17") comprising an inlet section (30), a middle section (32) which is connected to the inlet section, and an end section (34) which is connected to the middle section (32), arranged in series along an axis (38), wherein in the inlet section (30) the inflowing gas flow flows radially inwards, imposing a rotation around the axis (38), in the middle section (32) the gas flow flows further in the axial direction in an annular passage (28, 29) with reduced constant diameter, and finally, in the conically widening end section (34), reaches the gas outlet (35) of the swirl nozzle (17, 17', 17"), further comprising members in the inlet section (30) for accelerating the gas flow in the circumferential direction.

21. The swirl nozzle as claimed in claim 20, wherein the members comprise concentric annular nozzles (36) through which air is injected in a direction which is adapted to the rotation of the gas flow in the swirl nozzle (17').

22. The swirl nozzle as claimed in claim 20, wherein the members comprise wall segments (37) which rotate around the axis (38) of the swirl nozzle (17"), the rotational velocity of the wall segments is adapted to the rotation of the gas flow in the swirl nozzle (17").

23. A steam power plant (40), comprising a boiler (41) with a combustion chamber (43); a subsequent steam generator (42); and a $CO_2$ separating device (10) that separates $CO_2$ from an exhaust gas flow of a combustion process that operates with fossil fuels, the device comprising a swirl nozzle (17, 17', 17") which is exposed to through-flow of the gas flow, a compressor (13) which is located upstream or downstream of the swirl nozzle (17, 17', 17"), and a plurality of cooling devices (14, CC1, CC2) which are provided upstream of the swirl nozzle (17, 17', 17") for cooling of the gas flow which comes from the compressor (13), wherein the exhaust gases are fed to the $CO_2$ separating device (10) after leaving the boiler (41).

24. The steam power plant as claimed in claim 23, wherein the exhaust gases are cooled by a heat exchanger (39) which operates with cooling water before entering into the $CO_2$ separating device (10).

25. A combined cycle plant (50), comprising a gas turbine (46), a heat recovery steam generator (45) which is connected downstream, and a $CO_2$ separating device (10) that separates $CO_2$ from an exhaust gas flow of a combustion process that operates with fossil fuels, the device comprising a swirl nozzle (17, 17', 17") which is exposed to through-flow of the gas flow, a compressor (13) which is located upstream or downstream of the swirl nozzle (17, 17', 17"), and a plurality of cooling devices (14, CC1, CC2) which are provided upstream of the swirl nozzle (17, 17', 17") for cooling of the gas flow which comes from the compressor (13), wherein exhaust gases are fed to the $CO_2$ separating device (10) after leaving the heat recovery steam generator (45).

26. The combined cycle plant as claimed in claim 25, wherein some of the exhaust gases are returned to the gas turbine (46).

27. The combined cycle plant as claimed in claim 25, wherein the exhaust gases are cooled by a heat exchanger (39) which operates with cooling water before entering into the $CO_2$ separating device (10).

28. The combined cycle plant as claimed in claim 26, wherein the exhaust gases are cooled by a heat exchanger (39) which operates with cooling water before entering into the $CO_2$ separating device (10).

29. A combined heat and power plant (64) or a vehicle comprising an internal combustion engine (59) and a $CO_2$ separating device (10) that separates $CO_2$ from an exhaust gas flow of a combustion process that operates with fossil fuels, the device comprising a swirl nozzle (17, 17', 17") which is exposed to through-flow of the gas flow, a compressor (13) which is located upstream or downstream of the swirl nozzle (17, 17', 17"), and a plurality of cooling devices (14, CC1, CC2) which are provided upstream of the swirl nozzle (17, 17', 17") for cooling of the gas flow which comes from the compressor (13), wherein the exhaust gases of the internal combustion engine (59) are fed to the $CO_2$ separating device (10).

30. The combined heat and power plant (64) or vehicle as claimed in claim 29, wherein heat is extracted from the exhaust gases in an evaporator (58) before entry into the $CO_2$ separating device (10), which is part of a power circuit (PC) which is equipped with a power turbine (63), condenser (68) and pump (62).

31. The combined heat and power plant (64) or vehicle as claimed in claim 30, wherein the power turbine (63) is coupled with the compressor (13) of the $CO_2$ separating device (10).

32. The combined heat and power plant (64) or vehicle as claimed in claim 29 wherein the exhaust gases before entry into the $CO_2$ separating device (10), are cooled by a heat exchanger (57) which operates with cooling water.

33. A building heating system (66) comprising a heating boiler (65) and a $CO_2$ separating device (10) that separates $CO_2$ from an exhaust gas flow of a combustion process that operates with fossil fuels, the device comprising a swirl nozzle (17, 17', 17") which is exposed to through-flow of the gas flow, a compressor (13) which is located upstream or downstream of the swirl nozzle (17, 17', 17"), and a plurality of cooling devices (14, CC1, CC2) which are provided upstream of the swirl nozzle (17, 17', 17") for cooling of the gas flow which comes from the compressor (13), wherein the exhaust gases of the heating boiler (65) are fed to the $CO_2$ separating device (10).

34. The building heating system (66) as claimed in claim 33, wherein heat is extracted from the exhaust gases in an evaporator (58) before entry into the $CO_2$ separating device (10), which is part of a power circuit (PC) which is equipped with a power turbine (63), condenser (68) and pump (62).

35. The building heating system (66) as claimed in claim 34, wherein the power turbine (63) is coupled with the compressor (13) of the $CO_2$ separating device (10).

36. The building heating system (66) as claimed in claim 33 wherein the exhaust gases before entry into the $CO_2$ separating device (10), are cooled by a heat exchanger (57) which operates with cooling water.

* * * * *